March 19, 1968  G. W. FULLER  3,373,888
NON-BINDING CONTAINER AND COVER
Filed April 3, 1967
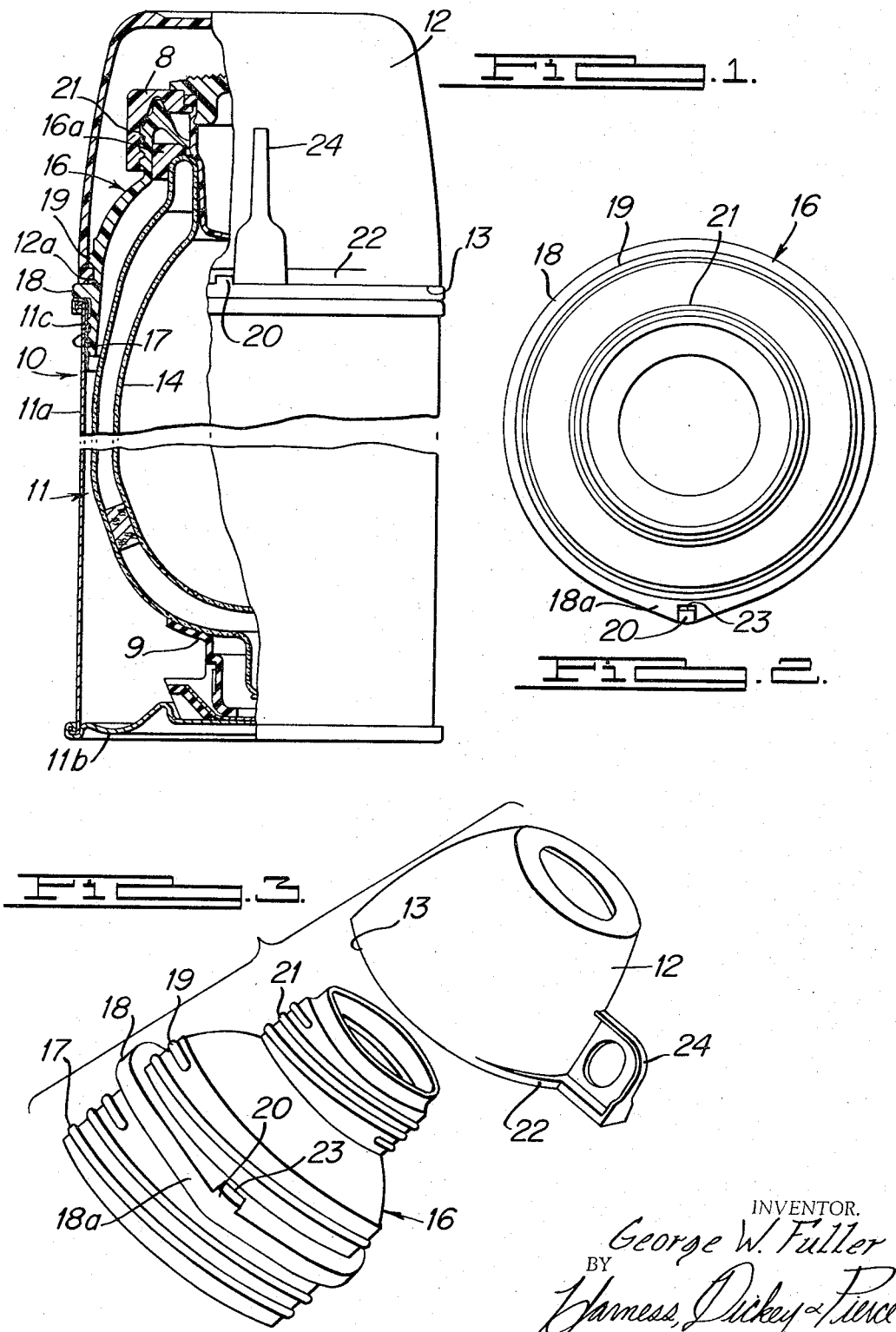
INVENTOR.
George W. Fuller
BY
Harness, Dickey & Pierce
ATTORNEYS.

United States Patent Office 3,373,888
Patented Mar. 19, 1968

3,373,888
NON-BINDING CONTAINER AND COVER
George W. Fuller, Hampton, Conn., assignor to King-Seeley Thermos Co., Ann Arbor, Mich., a corporation of Michigan
Filed Apr. 3, 1967, Ser. No. 627,734
4 Claims. (Cl. 215—13)

ABSTRACT OF THE DISCLOSURE

Provides vacuum ware comprising an evacuated filler received in a holder having a breast at its upper end and a cup or cover threaded onto the breast, particularly characterized by co-engageable radial camming means on the cup and breast which limit the threading-on movement of the cup and limit frictional binding between the cup and breast to less than the entire engaged areas thereof.

Background of the invention

This invention broadly relates to containers having a removable cover or cup. More particularly, the invention relates to insulated containers such as vacuum ware, vacuum bottles, or the like, which have a removable cover or cup which may be threadably connected to a breast portion of the holder or casing for the bottle, and incorporating improved means for preventing binding between the cup and the breast.

Vacuum bottle assemblies frequently comprise a cylindrical casing or holder, a hollow filler enclosed in the casing, a removable stopper closing the open end of the filler and a removable cup or cover. The filler is usually fabricated of glass and is of double wall construction in which the space between the walls is silvered and evacuated to minimize heat transfer through the walls of the filler and maintain the contents of the bottle at a substantially constant temperature. The filler usually has a neck which may define either a relatively wide or relatively narrow mouth for the filler and receives the removable stopper. The filler is resiliently supported between a shock absorber provided at the lower end of the casing or holder and a breast which may be threadably connected to the holder at the upper end thereof.

In the past considerable difficulty has been encountered in connection with constructions of the above generally indicated type. This is for the reason that when the cup is turned down onto the breast it usually engages a shoulder thereon and so develops a considerable pressure which in turn transmits a pressure to the entire thread contact area between the cup and breast. The cup tends to become slightly elliptical in shape when hand pressure of the user is applied to the cup in attempting to remove it and this tendency aggravates the binding of the cup upon the breast. Consequently, the cup may become so tightly bound to the breast that when it is attempted to remove the cup, what actually happens is that the breast turns with the cup and so is separated from the holder.

Accordingly, one object of this invention is to provide an improved container and cover combination.

Another object of the present invention is to provide an improved cover arrangement for vacuum ware.

Another object of the present invention is to provide an improved cup-type cover for use in conjunction with vacuum wave such as a vacuum bottle whereby when the cup is applied to the vacuum bottle, it may be done without causing a binding engagement which upon attempted removal of the cup from the bottle instead causes other parts of the bottle to be separated from each other.

Still another object of the present invention is to provide an improved combination of vacuum bottle with covering cup which utilizes a cam-like structure between the cup and the vacuum bottle which structure provides an easily releasable radial locking action between the cup and the bottle to thereby prevent the cup from becoming so securely bound to the breast of the vacuum bottle that upon attempted removal of the cup the breast is removed instead.

Other objects, features and advantages of the present invention will become apparent from the subsequent description and the appended claims taken in conjunction with the accompanying drawings, shown for illustrative purposes only and not in the way of limitation, in which:

FIG. 1 is a view partly in elevation and partly in vertical central section of a vacuum bottle embodying the invention;

FIG. 2 is a top plan view of the breast of the structure of FIG. 1; and,

FIG. 3 is an exploded perspective view of the cup and breast of FIG. 1.

Briefly stated, in the form herein illustrated, the invention is based on the concept that a cup threadably connected to the breast of a vacuum bottle can be prevented from objectionable binding against the breast by means of an easily releasable cam or radial locking structure which limits the binding engagement between the cup and the breast to a very minor portion of the circumferences thereof. More particularly, the locking structure interrupts the screw-down travel of the cup before the cup solidly seats against the breast and, at the same time a camming action takes place which limits the frictional binding between the cup and the breast to a relatively small circumferential area. This limited frictional bind can be readily released. In addition, since only a slight hand pressure is required to release the cam or radial locking structure there is little or no distortion of the cup in the area of its threaded contact with the breast.

In order to more fully describe the invention, reference is now made to the drawings.

In the drawing, a generally conventional vacuum bottle 10 is illustrated as comprising cup 12, filler 14, holder 11 and breast 16. Holder 11 has a cylindrical body 11a, a closed lower end 11b and a normally open upper end in which is secured an internally threaded insert 11c. The breast 16 is threaded into the insert 11c and in turn the cup 12 is threaded onto the breast 16. The filler is resiliently supported within the holder 11, with its lower end resting upon a resilient shock absorber 9 and its upper end seated against a gasket 16a carried by the breast 16. The usual stopper 8 is threaded onto the breast and has a neck which is received in and closes the upper end of the filler 14.

Breast 16 has three threads 17, 19 and 21 disposed thereon, all of which are shown as circumferentially continuous although segmental or other thread forms may be used. Thread 17 mates with thread 11c on the holder 11, thread 19 mates with an internal thread 12a near the rim 13 of the cup 12, and thread 21 mates with internal threads on the stopper 8.

Breast 16 has a radially projecting flange 18, lying between the threads 17 and 19. Flange 18 has a radially enlarged portion 18a which carries an upwardly projecting stop pin 20, which in the assembled position shown in FIGURE 1 is disposed for engagement by the handle 24 and, when so engaged, serves as a positive limit to the screw-down movement of the cup upon the breast. The hereinafter described camming action imposes a progressively increasing resistance to screw-down movement as the handle 24 approaches pin 20. The proportioning of the parts is such that even if the screw-down movement continues until handle 24 engages pin 20, it will not have progressed far enough to seat the rim 13 of the cup upon flange 18.

As is shown in FIG. 3, the outer face of the cup 12, near the rim thereof, carries a cam 22 which engages the radially inner cam face 23 of pin 20 as the cup approaches the stop or seated position and imposes the aforesaid progressively increasing resistance to turning movement between the cup and the breast. This engagement frictionally grips the adjacent rim portion of the cup between the pin 20 and the adjacent engaged portion of the thread 19 but lessens frictional engagement between the cup and the breast at some other points around the circumference of the cup. Hand pressure, as aforesaid, tends to distort the cup into slightly elliptical form. While this increases the frictional bond at localized points, it also decreases the frictional bond at other points.

Thus, in the present structure there is no frictional bond between the rim 13 of the cup and the upper surface of flange 18. The frictional bond between the cup and the breast exists between face 23 of stop 20, and the cam 22, and between the thread 19 and thread 12a on the cup. Also, the latter bond occurs only at spaced points around the circumference of the cup. These bonds are readily releasable by hand pressure applied to the cup.

It will be understood that the breast 16 is turned down into the holder 11 until the lower face of flange 18 solidly seats against the top edge of holder 11, thereby creating a full 360° frictional bond therebetween. Thus, the cup may readily be released from the breast without releasing the latter from the holder.

Preferably, cam surface 22 extends symmetrically on both sides of handle 24 and is of course of gradually varying height. Various design considerations govern the maximum height and the rate of rise of cam 22. As an example, with a cup radius of about 1.5 inches, a maximum height of about .03 inch, and an angular spread of about 60° from low point to low point has been found satisfactory.

While it will be apparent that the illustrated and preferred embodiment of the invention disclosed is well calculated to fullfil the objects above stated, it will be appreciated that the invention is susceptible to modification, variation and change, and is to be limited only by the proper scope and fair meaning of the subjoined claims.

What is claimed is:

1. In a container assembly comprising a container member and a cover member, the cover member being threaded onto the container member, and stop means being provided to interrupt said threading movement, the improvement which comprises providing interengaging cam means on the respective members which come into engagement just before stop means become effective to thereby apply a frictional binding force between the members which resists threading movement therebetween, and wherein the cover has a radially projecting handle and the cam means includes a progressively rising and falling cam projecting radially from the rim of the cover and symmetrically disposed relative to handle, and the stop means is a projection carried by the container for engagement by the handle.

2. A container assembly comprising
a holder member,
a hollow open ended filler member of insulated construction supported within the holder member,
a breast member threadedly engaged with the holder member and facilitating positioning of the filler member within the holder member,
a stopper to seal the open ended filler member,
a cover member over the breast member and threadedly engaged therewith,
stop means for interrupting threaded engagement between the cover member and breast member,
interengaging cam means on the cover member and breast member which cam means come into engagement just before the stop means become effective to thereby apply a frictional binding force between the cover member and breast member to resist threaded engagement therebetween,
said cam means and stop means providing for relatively easy non-binding removal of the cover member from the breast member without occurrence of undesirable thread disengagement of the breast member and filler member from the holder member.

3. The structure of claim 2 wherein the breast member carries a shoulder approached by the rim of the cover member as the latter is threaded into place and the stop means interrupts threading movement before the rim engages the shoulder.

4. In a container assembly comprising a container formed of two parts separable from each other by relative rotation, one of said parts having a shoulder, a rimmed cover member threadedly engaged with said one part so that threading movement in one direction moves the rim of said cover member toward said shoulder and would if not interrupted cause said rim to engage and frictionally bind on said shoulder, the improvement which comprises stop means to interrupt said threading movement before said rim engages said shoulder, and cam means on the respective cover and said one part which cam means come into engagement just before said stop means become effective to thereby apply frictional binding force between the members which resists threading movement therebetween.

References Cited
UNITED STATES PATENTS

| 1,858,163 | 5/1932 | De Boissac | 215—44 |
| 2,827,193 | 3/1958 | Martin | 215—43 |
| 3,233,769 | 2/1966 | Jessop | 215—43 |
| 3,295,708 | 1/1967 | Wathen | 215—43 |

JOSEPH R. LECLAIR, *Primary Examiner.*

ROBERT PESHOCK, *Examiner.*